United States Patent [19]

Guérin et al.

[11] Patent Number: 4,477,759
[45] Date of Patent: Oct. 16, 1984

[54] STEPPING MOTOR UNIT

[75] Inventors: Yves Guérin, Granges; Pierre-André Meister, Bienne, both of Switzerland

[73] Assignee: ETA S.A., Fabriques d'Ebauches, Granges, Switzerland

[21] Appl. No.: 486,641

[22] Filed: Apr. 20, 1983

[30] Foreign Application Priority Data

Apr. 21, 1982 [CH] Switzerland ............ 2411/82

[51] Int. Cl.³ ............................................. H02K 29/04
[52] U.S. Cl. ........................................ 318/696; 368/157
[58] Field of Search .............. 318/696, 685; 360/96.3, 360/96.1, 96.2, 96.4; 242/200–204; 310/49 R; 368/157, 160

[56] References Cited

U.S. PATENT DOCUMENTS

| | | | |
|---|---|---|---|
| 4,112,671 | 9/1978 | Kato et al. | 58/23 |
| 4,144,467 | 3/1979 | Nakajima et al. | 310/49 R |
| 4,169,983 | 10/1979 | Felder | 310/46 |
| 4,359,761 | 11/1982 | Papst | 360/96.3 |
| 4,361,790 | 11/1982 | Laesser et al. | 318/696 |
| 4,367,049 | 1/1983 | Laesser et al. | 368/76 |
| 4,382,693 | 5/1983 | Tu Xuan | 368/160 |

Primary Examiner—J. V. Truhe
Assistant Examiner—Saul M. Bergmann
Attorney, Agent, or Firm—Pollock, Vande Sande & Priddy

[57] ABSTRACT

The motor unit comprises a stator, two independent rotors having each a permanent magnet located in a cylindrical space defined by three pole faces of the stator, two windings and at least a positioning magnet for holding both rotors, in the absence of current in the windings, in a position in which the magnetic axes of their magnets are each coincident with a rest axis. The field produced by the flow of a current in one of the windings is always at an obtuse angle to one of the rest axes and at an acute angle to the other.

The two rotors perform steps of 360° independently of each other in response to pairs of current pulses, the first of which is applied to one of the windings and the second of which is applied to the other winding. The direction of the current pulses determines which of the rotors performs a step, and the order in which the current pulses are applied to the windings determines the direction of rotation of that rotor.

The motor unit can be used in particular in an electronic timepiece.

15 Claims, 13 Drawing Figures

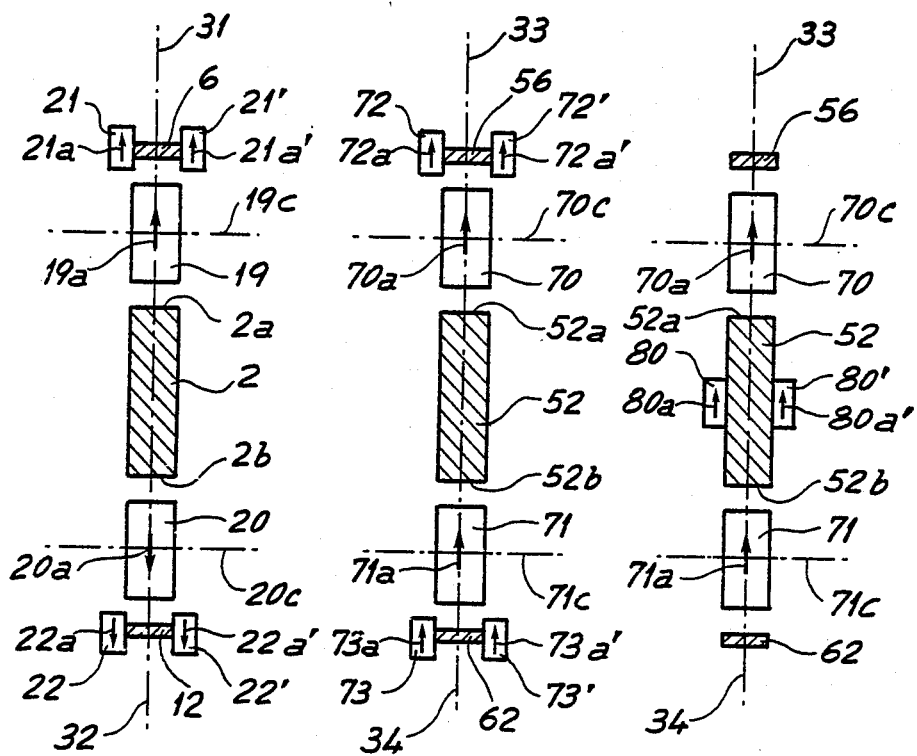

STEPPING MOTOR UNIT

BACKGROUND OF THE INVENTION

The present invention concerns a stepping motor unit for driving two movable elements independently of each other. These elements may be particularly but not exclusively, two time information display elements in an electronic timepiece.

Electronic timepieces with mechanical elements for displaying time information, such as hands or indicator discs, generally comprise a motor coupled to display elements by a gear train. The motor is generally a stepping motor whose rotor comprises a permanent magnet magnetically coupled to a winding by means of a stator. An electronic actuating circuit applies periodic pulses to the winding and the rotor advances by one step, that is to say, generally half a revolution, for each of the pulses applied.

Most of such motors are intended to rotate only in one direction. Sometimes however, it is desired that the motor be capable of rotating in both directions, in particular to facilitate setting the time on the watch. A particular arrangement of the actuating circuit, described for example in U.S. Pat. No. 4,112,671, permits rotation in both directions of a motor which is intended normally to rotate only in one direction. There are also bi-directional or reversible motors such as that described in Swiss Pat. No. 616,302 which are designed to rotate in both directions.

Certain timepieces, in particular that described in Swiss Pat. No. 613,837, are provided with two reversible motors. One of those motors drives for example the elements for displaying seconds and minutes, while the other drives the elements for displaying the hours and the date. Such an arrangement greatly facilitates setting the time displayed by the timepiece and in particular facilitates changing the time zone displayed, which can be effected without the display of seconds and minutes being upset.

The space available in a timepiece and in particular in a wristwatch being severely limited, it is difficult to house two motors therein. In addition, as the motors are relatively expensive components, the cost price of the watch is increased substantitally by the provision of the two motors.

SUMMARY OF THE INVENTION

The object of the present invention is to provide a motor unit which makes it possible to perform the same functions as two separate motors while occupying a substantially smaller volume and being substantially less expensive than the two motors.

This object is achieved by the motor unit claimed, which comprises two rotors which are similar to the rotors of the conventional stepping motors, each comprising a bipolar permanent magnet whose magnetic axis is perpendicular to the axis of rotation of the rotor. In the absence of any other influence, the two rotors are held in a rest position by one or two positioning magnets. Two magnetic fields each produced by a winding are coupled with the rotors by pole faces disposed in threes around each of the rotors. With a first direction of current flow in the windings, the magnetic fields are at an obtuse angle to the rest axis of one of the rotors and an acute angle to the rest axis of the other rotor. In the other direction of current flow in the windings, the magnetic fields are at an acute angle to the rest axis of the first rotor and an obtuse angle to the rest axis of the second rotor.

Individual stepping actuation of the rotors is effected by pairs of current pulses of the same direction, the first of which is applied to one of the windings while the second is applied to the other winding. The direction of the current pulses determines which of the rotors performs a step, and the order in which they are applied to the windings determines the direction of rotation of that rotor.

BRIEF DESCRIPTION OF THE DRAWINGS

The invention will now be described in detail with reference to the accompanying drawings in which:

FIG. 1a is a view in section of an alternative form of the motor unit shown in FIG. 1.

DESCRIPTION OF THE PREFERRED EMBODIMENTS

Figure 1:
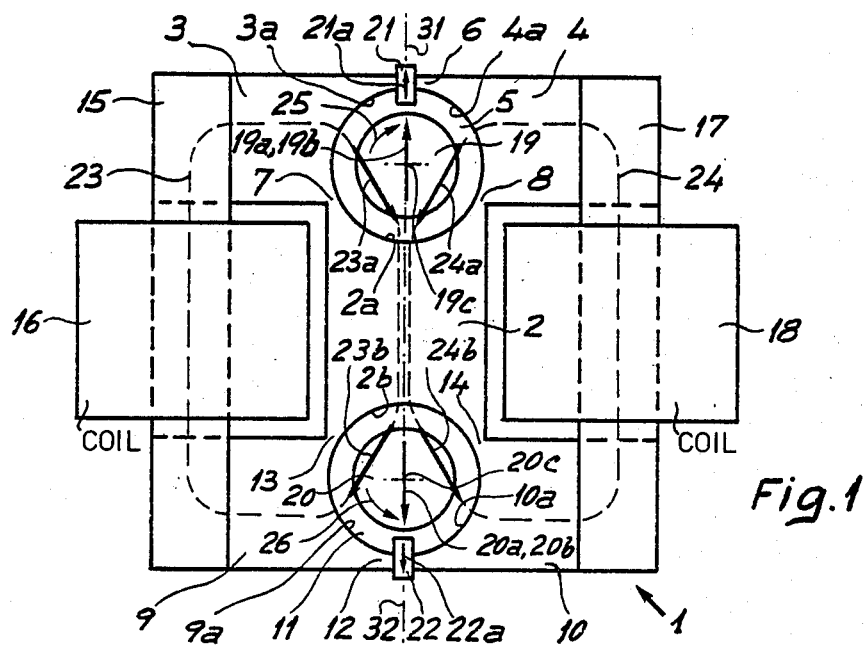
FIG. 1 is a plan view of a first embodiment of the motor unit according to the invention.

In the embodiment shown in FIG. 1, the motor unit according to the invention, which hereinafter will be referred to merely as the motor, comprises a stator 1 formed by a plate of soft magnetic material.

The stator 1 comprises a first pole piece 2 whose ends are cut out in the form of concave circular arcs, forming two pole faces 2a and 2b. The stator 1 further comprises two other pole pieces 3 and 4 each having an end cut out in the form of a concave circular arc, thus forming two other pole faces 3a and 4a respectively.

The pole pieces 2, 3 and 4 are so disposed that the pole faces 2a, 3a and 4a define a cylindrical space 5 therebetween. The ends of the pole faces 2a, 3a and 4a are connected by regions 6, 7 and 8 in the form of isthmus portions of sufficiently small section that the reluctance thereof is substantially greater than that of the pole pieces 2, 3 and 4 and the remainder of the magnetic circuit which will be described below.

The stator 1 further comprises two other pole pieces 9 and 10 which are comparable to the pole pieces 3 and 4, the ends thereof being cut out in the form of a concave circular arc to form pole faces 9a and 10a. The pole pieces 2, 9 and 10 are so disposed that the pole faces 2b, 9a and 10a define a second cylindrical space 11 therebetween. The pole faces 2b, 9a and 10a are connected by isthmus portions 12, 13 and 14, the reluctance of which is also higher than that of the remainder of the magnetic circuit.

In the example described, the isthmus portions 6, 7, 8, 12, 13 and 14 are in one piece with the pole pieces 2, 3, 4, 9 and 10. In other embodiments which will not be described herein, they could be replaced by pieces of non-magnetic material or by air gaps. In the latter case, the pole pieces 2, 3, 4, 9 and 10 would be individually fixed on a common support.

The ends of the pole pieces 3 and 9 which are remote from the pole faces 3a and 9a are connected by an armature 15 which forms the core of a winding 16. Likewise, the ends of the pole pieces 4 and 10 which are remote from the pole faces 4a and 10a are connected by an armature 17 which forms the core of a second winding 18.

The armatures 15 and 17 are fixed to the pole pieces 3, 4, 9 and 10 for example by screws (not shown) which can also serve to secure the stator 1 in the location for which it is intended. It will be appreciated that the connection between the armatures and the pole pieces is such that the reluctance of the connection is as low as possible.

The motor further comprises two rotors which, conventionally, each comprise a cylindrical diametrally magnetized permanent magnet secured to a shaft which is rotatable between two bearings about an axis perpendicular to the general plane of FIG. 1. The rotors each also carry a pinion. The pinions are intended to engage with the first wheels of two gear trains. As in abovementioned Swiss Pat. No. 613,837, one of the gear trains can serve to drive a second hand and a minute hand, and the other can serve to drive an hour hand and a date display disc. Other combinations of the display elements may of course be employed.

In order not to encumber the drawings, only the permanent magnets 19 and 20 are shown in FIG. 1 and rotary movements of the rotors will be equated with rotary movements of the magnets 19 and 20.

The magnetic axes of the magnets 19 and 20 are diagrammatically indicated by arrows 19a and 20a which are directed from their south pole towards their north pole. The magnetic axes are obviously perpendicular to the axes of rotation of the rotors, as indicated at 19c and 20c.

Two positioning magnets 21 and 22 in the form of longitudinally magnetized bars are disposed on the stator 1 at the location of the isthmus portions 6 and 12 respectively, in such a way as to be magnetically coupled to the magnets 19 and 20 respectively. The magnetic axes of the positioning magnets 21 and 22 are diagrammatically indicated by the arrows 21a and 22a which point from their south pole towards their north pole. The magnets 21 and 22 are so disposed that the directions of said axes 21a and 22a are substantially coincident with two straight lines 31 and 32 respectively which are perpendicular to the axes of rotation 19c and 20c of the rotors 19 and 20 and which pass through the middle of the pole faces 2a and 2b. In addition, the axes 21a and 22a are respectively oriented in a direction from the middle of the pole face 2a towards the axis of rotation 19c of the magnet 19 and a direction from the middle of the pole face 2b towards the axis of rotation 20c of the magnet 20.

The magnetic fields of the magnets 21 and 22 apply to the magnets 19 and 20 a positioning torque with a period of 360°, which tends to return the magnets 19 and 20 to or hold them in the rest positions shown in FIG. 1. In these rest positions, the magnetic axes 19a and 20a of the magnets 19 and 20 are coincident with two fixed rest axes 19b and 20b which are disposed on the straight lines 31 and 32 respectively and which are of the same orientation as the respective magnetic axes 21a and 22a.

In the embodiment described with reference to FIG. 1, the pole piece 2 is flat and rectilinear, which means that the straight lines 31 and 32 are coincident. The two rest axes 19b and 20b are therefore aligned. However, that arrangement is not an obligatory one. The pole piece 2 could be of any shape, flat or otherwise, in which the straight lines 31 and 32 would not be coincident.

Irrespective of the form of the pole piece 2 and therefore irrespective of the relative disposition of the straight lines 31 and 32, the rest axis 19b must be disposed on the straight line 31 and the rest axis 20b must be disposed on the straight line 32. To fulfil that requirement, the magnetic axes 21a and 22a may obviously also be disposed anywhere on the straight lines 31 and 32 respectively. However, that arrangement is also not obligatory. In fact, it can be readily seen that, in order for the rest axis 19b to be oriented in the desired direction, the magnetic axis 21a may be disposed virtually anywhere in a plane defined by the axis of rotation 19c and the straight line 31. The only positions at which the magnetic axis 21a cannot be disposed are those where it is coincident with the axis of rotation 19c.

In any position in which it may be located, the magnetic axis 21a may also be oriented in any direction in which the field of the magnet 21 is such that the resultant thereof in the part of the above-defined plane which is in the cylindrical space 5 has a non-zero component in the desired direction of the rest axis 19b.

The same considerations may apply in regard to the positioning magnet 22. The magnetic axis 22a of the magnet 22 may therefore be disposed virtually anywhere in a plane defined by the axis of rotation 20c and the straight line 32, except for the positions where the magnetic axis 22a is coincident with the axis of rotation 20c. The magnetic axis 22a may also be oriented in any directions in which the field of the magnet 22 is such that the resultant thereof in the part of the above-defined plane which is in the cylindrical space 11 has a non-zero component in the desired direction of the rest axis 20b.

It will be appreciated that the positioning magnet 21 must be so disposed as to apply a greater force to the magnet 19 than to the magnet 20, and that conversely the positioning magnet 22 must be so disposed as to apply a greater force to the magnet 20 than to the magnet 19.

It follows from the foregoing condiderations that the two positioning magnets 21 and 22 could be replaced by a single magnet having a magnetic axis disposed on a straight line substantially perpendicular to the pole piece 2 and intersecting same at a point disposed approximately halfway between the middles of the pole faces 2a and 2b.

In all the cases where the positioning magnet 21 for example is not disposed precisely in the same plane as the magnet 19, the force that it applies thereto has a component parallel to the axis of rotation 19c. That axial component gives rise to an increase in the friction of one of the pivots of the rotor comprising the magnet 19 in its bearing. That disadvantage can be overcome by adding another positioning magnet which is similar to the magnet 21 and which is disposed at a location such that its magnetic axis is substantially symmetrical to the magnetic axis 21a with respects to the straight line 31.

Therefore, the further positioning magnet applies to the magnet 19 a force whose component which is directed along the axis of rotation 19c nullifies or at least decreases that which is due to the magnet 21.

It will be apparent that similar considerations may apply in regard to the force produced by the positioning magnet 22 on the magnet 20, and that another positioning magnet having a magnetic axis substantially symmetrical to the magnetic axis 22a with respect to the straight line 32 also permits the axial force applied to the magnet 20 by the magnet 22 to be nullified or at least decreased.

FIG. 1a is a view in cross-section of an example of a motor comprising the above-mentioned additional positioning magnets. All the other components of the motor shown are identical to the corresponding components of the motor shown in FIG. 1 and are denoted by the same references. The cross-sectional view in FIG. 1a goes through the two axes of rotation 19c and 20c and the additional positioning magnets and their magnetic axes are denoted by references 21' and 21a', and 22' and 22a' respectively.

When a current flows through the winding 16 for example, the magnetic field generated by that current follows a magnetic circuit which in series comprises the armature 15, the pole piece 3, the cylindrical space 5 between the pole face 3a and the pole faces 2a and 4a, a circuit part formed by the parallel disposition of the pole piece 2 on the one hand and the pole piece 4, the armature 17 and the pole piece 10 on the other hand, the cylindrical space 11 between the pole faces 2b and 10a and the pole face 9a, and the pole piece 9. That field obviously passes through the magnets 19 and 20.

The lines of force of that magnetic field are diagrammatically indicated by the broken line 23. In order not to clutter the drawing, these lines of force are not shown in the part of the circuit formed by the pole piece 4, the armature 17 and the pole piece 10.

The arrow indicated at 23a diagrammatically shows the resultant of the field generated in the space 5, between the pole face 3a and the pole faces 2a and 4a, by a current flowing in the winding 16. Likewise, the arrow 23b diagrammatically indicates the resultant of that field in the space 11, between the pole face 9a and the pole faces 2b and 10a. The direction of the arrows 23a and 23b denotes the direction of the field generated by the winding 16 in response to a current which is arbitrarily defined as positive. That field is such that the pole face 3a acts as a north pole and the pole face 9a acts as a south pole. The field is obviously in the opposite direction when the current flowing through the winding 16 is in the opposite direction, that is to say, when it is a negative current. The pole face 3a then acts as a south pole and the pole face 9a acts as a north pole.

Similar considerations may be applied in regard to the field generated by the flow of a current through the winding 18. The broken line 24 diagrammatically represents the lines of force of such a field and the arrows 24a and 24b represent that field in the cylindrical spaces 5 and 11, in the direction it has when a current arbitrarily designated positive flows in the winding 18. The pole face 4a then acts as a north pole and the pole face 10a acts as a south pole. When the current in the winding 18 is negative, the direction of the field is obviously reversed and the pole face 4a acts as a south pole and the pole face 10a acts as a north pole.

It should be noted that, when the current flowing through the winding 16 is positive, the field that is generated thereby in the spaces 5 and 11 and which is indicated by arrows 23a and 23b forms an obtuse angle to the rest axis 19b and an acute angle to the rest axis 20b. In addition, that field is substantially perpendicular to the axes of rotation 19c and 20c.

Likewise, when the current flowing through the winding 18 is positive, the field that it generates also in the spaces 5 and 11 and which is represented by the arrows 24a and 24b also forms an obtuse angle to the rest axis 19b and an acute angle to the rest axis 20b. That field is also substantially perpendicular to the axes of rotation 19c and 20c.

FIG. 1 illustrates those two situations.

It is clear that each angle as referred to above, and each of those which will be referred to hereinafter is the angle that would be formed by the arrows representing the field and the rest axis if one of those two were displaced parallel to itself until its point of origin coincides with the point of origin of the other.

If the direction of the current flowing in the windings 16 and 18 is reversed, the fields that they produce form in the space 5 an acute angle to the rest axis 19b and in the space 11 an obtuse angle to the rest axis 20b. That situation is not illustrated, but it can be easily deduced from FIG. 1 by simply reversing the arrows 23a, 23b, 24a and 24b.

The pole faces 2a and 2b are each substantially symmetrical with respect to the respective rest axis 19b and 20b. In addition, the pole faces 3a and 4a are substantially symmetrical to each other with respect to the rest axis 19b and the pole faces 9a and 10a are substantially symmetrical to each other with respect to the rest axis 20b. It follows from the above-indicated arrangement of the pole faces that the angles formed between the rest axes and the fields produced by the windings 16 and 18 are symmetrical with respect to the rest axes when the currents in the windings are in the same direction. The magnitude of the various angles depends in particular on the angle occupied around the spaces 5 and 11 by each of the pole faces 2a, 3a, 4a and 2b, 9a and 10a.

In practice, the obtuse angles formed in each of the cylindrical spaces by the rest axes and the fields produced by the windings are between about 100° and about 160° and are preferably substantially equal to 120°.

The acute angles formed by the above-mentioned axes and the above-mentioned fields are therefore between about 20° and about 80°. The prefered value of 120° for the obtuse angles corresponds to a value of 60° for the acute angles.

The mode of operation of the motor shown in FIG. 1 will now be described with reference to FIG. 2.

Figure 2:
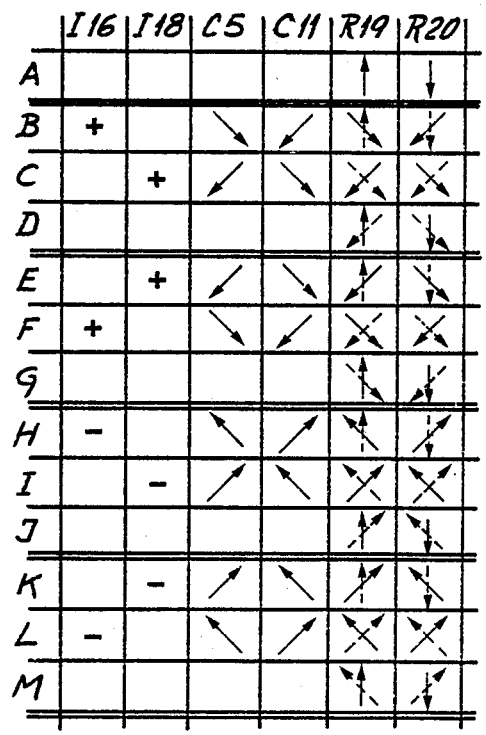
FIG. 2 is a table summarizing the various stages in actuation of the motor unit shown in FIG. 1.

FIG. 2 shows a table in which line A corresponds to the rest condition of the motor. Each of the other lines B to M corresponds to a stage in actuation of the motor.

The signs + or − entered in the columns headed I16 and I18 indicate that a positive current or a negative current respectively is flowing in the winding 16 or the winding 18 at the corresponding stage. The absence of any sign indicates of course that no current is flowing in the winding 16 or the winding 18.

The arrows shown in the columns headed C5 and C11 indicate the direction and the orientation of the field generated in the cylindrical space 5 and in the cylindrical space 11 respectively by the current indicated in column I16 or I18 on the same line.

To simplify the following description, reference will be made only to rotation of the magnets 19 and 20. The rotors of which those magnets form part will obviously perform the same rotary movements.

The positions assumed by the magnets 19 and 20 in response to the fields indicated in columns C5 and C11 or under the influence of the positioning torque are indicated in columns R19 and R20 by solid-line arrows designating the magnetic axes 19a and 20a. In line A, those arrows therefore also represent the rest axes 19b and 20b. The broken-line arrows entered in columns R19 and R20 refer to the position that the magnetic axes 19a and 20a occupied before assuming the position shown by the solid-line arrows.

Finally, the values of the acute and obtuse angles referred to above are arbitrarily selected at 45° and 135° in FIG. 2, for enhanced clarity of the drawing. Such values are given only by way of non-limiting example.

Line A in the table shown in FIG. 2 corresponds to the rest position of the motor. No current is flowing in the windings 16 and 18 and the magnetic axes 19a and 20a are coincident with the rest axes 19b and 20b.

Lines B, C and D summarize the mode of actuating the motor in order for the magnet 19, and therefore the rotor of which it is part, to perform a step, that is to say, a complete revolution, in the direction indicated by arrow 25 in FIG. 1. That direction is arbitrarily selected as the positive direction of rotation for that magnet.

Positive current is first caused to flow in the winding 16 by a control circuit, an example of which will be described hereinafter (line B). The field generated by that current in the cylindrical space 5 is in the direction and of the orientation indicated at column C5. If the intensity of the current flowing in the winding 16 is sufficient, the magnet 19 rotates until its magnetic axis 19a becomes parallel to that field. As, in that case, the field diagrammatically indicated in column C5 is at an obtuse angle to the rest axis 19b, the magnet 19 rotates through an angle of more than 90° in the positive direction.

When the magnet 19 at least approximately reaches the position shown in column R19, the control circuit cuts off the current in the winding 16 and causes a positive current to flow in the winding 18 (line C). The field produced by that current in the cylindrical space 5 is in the direction and of the orientation indicated in column C5. The magnet 19 therefore continues to rotate in the positive direction until its magnetic axis 19a becomes parallel to that magnetic field. That position is shown in column R19.

When the magnet 19 reaches that position, at least approximately, the control circuit cuts off the current in the winding 18 (line D). The magnet 19 is then subjected solely to the field of the positioning magnet 21 which causes it to complete its rotary movement. The magnet 19 therefore resumes its rest position after having performed a complete revolution in the positive direction in response to a pair of positive current pulses, the first of which is applied to the winding 16 and the second to the winding 18.

It will be apparent that, whenever such a pair of positive current pulses is applied to the windings 16 and 18 in that order, the magnet 19 and therefore the rotor of which it is part will again perform a complete revolution in the positive direction.

The fields generated by the currents which are caused to flow in the windings 16 and 18 to cause the magnet 19 to rotate also pass through the cylindrical space 11. Their direction and orientation are indicated in column C11. The magnet 20 therefore also rotates in response to the first current pulse applied to the winding 16, through an angle equal to the angle formed by the field produced by that current pulse and the rest axis 20b, until reaching the position indicated in column R20 at line B. That angle is an acute angle and, therefore, when the current flowing in the winding 16 is cut off and a current is caused to flow in the winding 18, the magnet 20 begins to rotate in the opposite direction to the previous direction. It returns through its rest position and reaches the position shown at line C. In that position, its magnetic axis 20a is also at an acute angle to the rest axis 20b. When the current in the winding 18 is cut off at the stage indicated by line D, the magnet 20 therefore resumes its rest position under the influence of the positioning torque generated by the magnet 22.

The magnet 20 therefore only performs a rocking movement about its rest position in response to the pair of positive current pulses which is caused to flow in the windings 16 and 18 to rotate the magnet 19.

Lines E, F and G of the table shown in FIG. 2 summarize the mode of actuating the motor in order for the magnet 19 to rotate by one step in the negative direction.

The control circuit first causes a positive current to flow in the winding 18 (line E). The field produced by that current in the cylindrical space 5 is indicated in column C5, and the magnet 19 rotates in its negative direction to the position indicated in column R19. Once again, the magnet 19 rotates through an angle of more than 90° since the field produced by a positive current in the winding 18 is at an obtuse angle to the rest axis 19b.

When the magnet 19 at least approximately reaches the position shown in column R19, the control circuit cuts off the current in the winding 18 and causes a positive current to flow in the winding 16 (line F). The magnet 19 therefore continues its rotary movement in the negative direction until its magnetic axis 19a is parallel to the direction of the field indicated in column C5.

The control circuit then cuts off the current in the winding 16 and the magnet 19 concludes its rotary movement in response to the positioning torque produced by the magnet 21.

The magnet 19 has therefore performed a complete revolution in the negative direction in response to a pair of positive current pulses, the first of which is applied to the winding 18 and the second to the winding 16.

It will be readily seen that, in this case too, the magnet 20 performs only a rocking movement about its rest position in response to the two positive current pulses.

Lines H, I and J of the table shown in FIG. 2 summarize the mode of actuating the motor in order for the magnet 20 to perform a step, that is to say, also a complete revolution, in the direction indicated by arrow 26 in FIG. 1, which is arbitrarily selected as being the positive direction of rotation of the magnet 20.

The control circuit first causes a negative current to flow in the winding 16 (line H). The field produced by that current in the cylindrical space 11 is therefore in the opposite direction to that indicated in FIG. 1 by the arrow 23b. That field is indicated in column C11. In this case, it is at an obtuse angle to the rest axis 20b and the magnet 20 therefore rotates through an angle of more than 90° in the positive direction.

When the magnet 20 at least approximately reaches the position shown in column R20, the control circuit cuts off the current in the winding 16 and causes a negative current to flow in the winding 18 (line I). The field produced by that current in the cylindrical space 11 is indicated in column C11. The magnet 20 therefore continues to rotate in the positive direction until reaching the position shown in column R20.

The control circuit then cuts off the current in the winding 18 (line J) and the magnet 20 concludes its rotary movement under the influence of the positioning torque produced by the magnet 22.

The magnet 20 therefore performs a step in the positive direction in response to a pair of negative current pulses, the first of which is applied to the winding 16 and the second to the winding 18.

It will be readily seen that, in this case, the fields produced by the negative current pulses in the windings 16 and 18 are at an acute angle to the rest axis 19b of the magnet 19. The latter therefore only performs a rocking movement about its rest position, in response to the negative current pulses.

Lines K, L and M of the table shown in FIG. 2 summarize the mode of actuating the motor in order for the magnet 20 to perform a step in the negative direction.

The control circuit first causes a negative current to flow in the winding 18 (line K). The field created by that current in the cylindrical space 11 is indicated in column C11. The magnet 20 rotates through an angle of more than 90° in the negative direction until it reaches the position indicated in column R20.

The control circuit then cuts off the current in the winding 18 and causes a negative current to flow in the winding 16 (line L). The magnet 20 therefore continues to rotate in the negative direction under the influence of the field indicated in column C11 until it reaches the position shown in column R20.

The control circuit then cuts off the current in the winding 16 (line M) and the magnet 20 concludes its step under the influence of the positioning torque.

The magnet 20 therefore performs a step in the negative direction in response to a pair of negative current pulses, the first of which is applied to the winding 18 and the second to the winding 16.

It will be readily seen that in this case too, the magnet 19 performs only a rocking movement about its equilibrium position.

In the above described example, the positioning magnets 21 and 22 are so disposed that the rest axes 19b and 20b are both in a direction going from the middle of the respective pole faces 2a and 2b towards the respective axis of rotation 19c and 20c. It will be appreciated that the positioning magnets 21 and 22 could be so disposed that the rest axes 19b and 20b are both in the opposite direction. In that case, the field produced in the cylindrical spaces 5 and 11 by a current of the positive direction as defined above, flowing in the winding 16 or in the winding 18, would be at an acute angle to the rest axis 19b and an obtuse angle to the rest axis 20b. Conversely, the field produced in the cylindrical spaces 5 and 11 by a negative current flowing in the winding 16 or in the winding 18 would be at an obtuse angle to the rest axis 19b and at an acute angle to the rest axis 20b. The pairs of positive current pulses described hereinbefore would therefore cause the magnet 20 to rotate, and the pairs of negative current pulses would cause the magnet 19 to rotate. The direction of rotation of those magnets would also be positive if the first pulse of each pair were applied to the winding 16, and the direction of rotation would be negative if the first pulse were applied to the winding 18.

To sum up, it will be seen that the two magnets, and therefore the rotors of which they are part, are actuated individually and stepwise by pairs of current pulses having the same direction, the first of which is applied to one of the windings and the second is applied to the other winding. The direction of the current pulses determines which of the magnets performs a step, and the order in which they are applied to the windings determines the direction of rotation of that magnet.

In the example of actuation of the motor, as described hereinbefore, the end of the first pulse of each pair coincides with the beginning of the second pulse. Depending on the mechanical load to be driven by the motor, it is possible for the second pulse of each pair to be triggered a moment before or after the end of the first pulse. In the former case, the torque produced by the motor is increased, at the expense of a slight increase in consumption. In contrast, in the second case, the consumption of the motor is reduced, at the cost of a slight reduction in the torque that it can produce.

Figure 3:
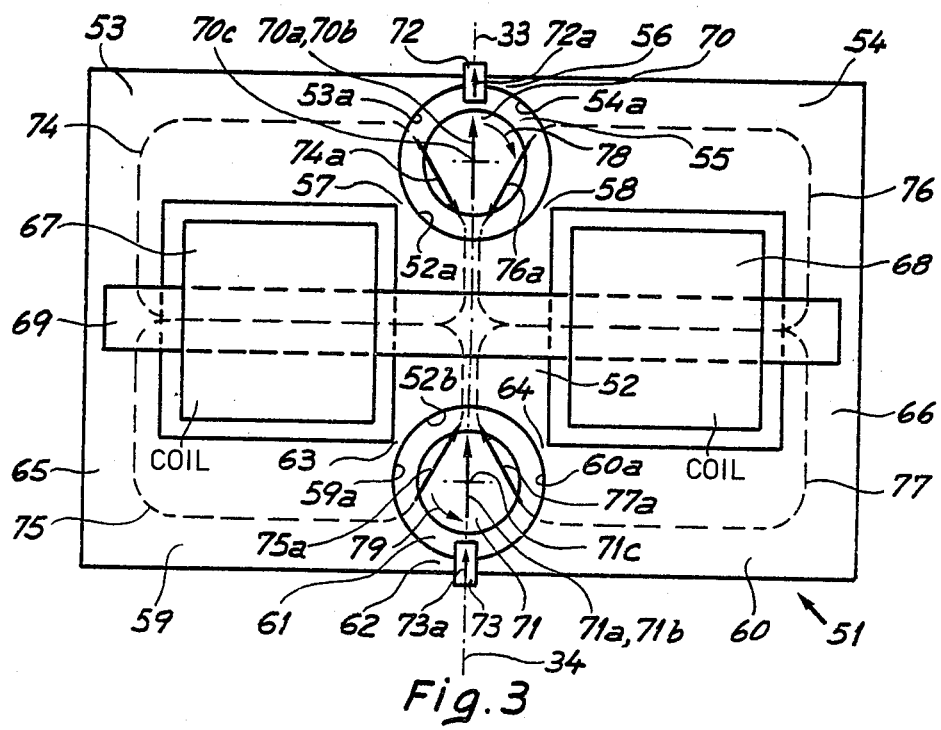
FIG. 3 is a plan view of a second embodiment of the motor unit according to the invention.

FIG. 3 is a plan view of another embodiment of the motor unit according to the invention.

Like the motor shown in FIG. 1, the motor shown in FIG. 3 comprises a stator 51 formed by a plate of soft magnetic material. The stator 51 comprises a first pole piece 52, the ends of which are cut out in the form of concave circular arcs, forming two pole faces 52a and 52b.

The stator 51 comprises two other pole pieces 53 and 54 which each have an end cut out in the form of a concave circular arc, thereby forming two pole faces 53a and 54a. The pole faces 52a, 53a and 54a define a cylindrical space 55 and they are joined by isthmus portions 56, 57 and 58.

The stator 51 further comprises two pole pieces 59 and 60 each having an end cut out in the form of a circular arc, thereby forming pole faces 59a and 60a respectively. The pole faces 52b, 59a and 60a define a second cylindrical space 61 and they are joined by isthmus portions 62, 63 and 64.

As in the embodiment shown in FIG. 1, the isthmus portions 56, 57, 58, 62, 63 and 64 which are in one piece with the pole pieces 52, 53, 54, 59 and 60 could be replaced by pieces of non-magnetic material or by air gaps.

The ends of the pole pieces 53 and 59 which are remote from the pole faces 53a and 59a are connected by an armature 65 which, in the illustrated embodiment, is in one piece therewith.

Likewise, the ends of the pole pieces 54 and 60 which are remote from the pole faces 54a and 60a are connected by an armature 66 which is also in one piece therewith.

In the embodiment shown in FIG. 3, the motor also comprises two windings indicated at 67 and 68. The windings 67 and 68 are mounted on a common core 69 which is fixed in a manner not shown in the drawing to the armatures 65 and 66 and to the pole pieces 52.

Figure 3A:
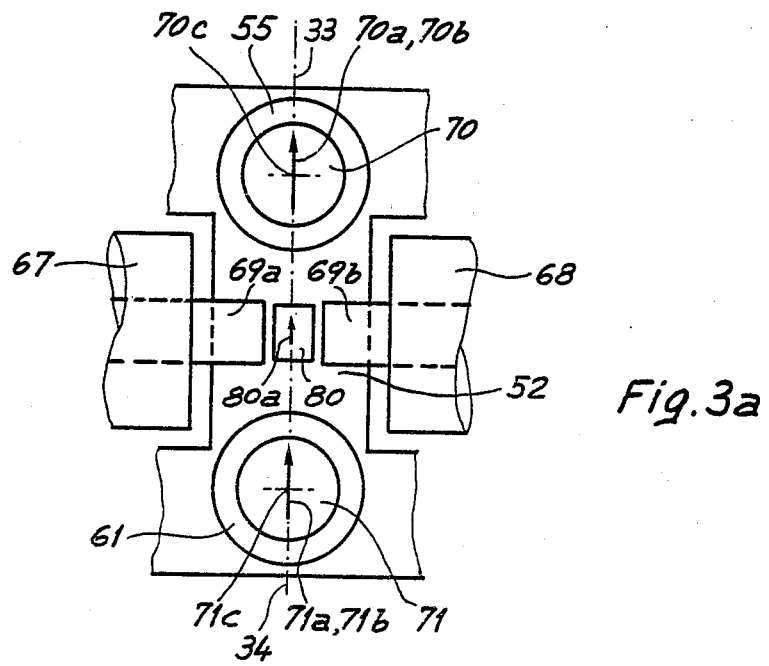
FIG. 3a is a plan view of part of an alternative form of the motor unit shown in FIG. 3, FIGS. 3b and 3c are cross-sectional views of alternative forms of the motor unit shown in FIG. 3.

In an alternative form of this embodiment, of which part is shown in FIG. 3a, the core 69 which is common to the windings 67 and 68 is replaced by two separate cores 69a and 69b. A first end of each of the cores 69a and 69b is connected to the pole piece 52 and their second end (not shown in FIG. 3a) is connected to the armature 65 and the armature 66 respectively.

The motor comprises two rotors which, as in the FIG. 1 construction, are represented only by the magnets 70 and 71 which are part thereof.

Two positioning magnets 72 and 73 in the form of longitudinally magnetized bars are disposed on the stator 51 in the vicinity of the magnets 70 and 71, at the location of the isthmus portions 56 and 62, so as to be magnetically coupled to the magnet 70 and magnet 71 respectively. The magnets 72 and 73 are so disposed that the directions of their magnetic axes 72a and 73a are substantially coincident with two straight lines 33 and 34 respectively which are perpendicular to the axes of rotation 70c and 71c respectively and which are passing through the middle of the pole faces 52a and 52b respctively. In addition, the magnetic axis 72a is oriented in a direction from the middle of the pole face 52a towards the axis of rotation 70c, while the magnetic axis 73a is oriented in a direction from the axis of rotation 71c towards the middle of the pole face 52b.

In the absence of any outside influence, the magnets 70 and 71 are therefore each subjected to a positioning torque which holds their magnetic axis 70a and 71a in the position in which it is shown in FIG. 3. In that position, the axes 70a and 71a coincide with rest axes 70b and 71b. As in FIG. 1, the rest axes pass substantially through the middle of the pole faces 52a and 52b respectively, and through the axes of rotation 70c and 71c of the magnets 70 and 71, that is to say, the direction thereof coincides with the straight lines 33 and 34 respectively. It will be appreciated that they point in the same direction as the magnetic axes 72a and 73a.

In another alternative form of that embodiment, which is also shown in FIG. 3a, the two positioning magnets 72 and 73 are replaced by a single magnet 80. The magnet 80 is disposed on the pole piece 52 in such a way that its magnetic axis 80a is disposed on a line connecting the middles of the pole faces 52a and 52b.

The positioning torques applied by the magnet 80 to the magnets 70 and 71 are identical to those produced by the magnets 72 and 73 in FIG. 3. The rest axes 70b and 71b are therefore also identical to those shown in FIG. 3.

It should be noted that this alternative embodiment and the alternative embodiment described above may be produced independently of each other. They are only shown together in order to avoid unnecessarily increasing the number of figures of drawings.

In the embodiment described with reference to FIG. 3, the pole piece 52 is flat and straight, which means that the straight lines 33 and 34 are coincident. As in the case of the FIG. 1 construction, that arrangement is not an obligatory one and the pole piece 52 could be of any shape, flat or not, in which the straight lines 33 and 34 could be non-coincident.

Similar considerations to those set out above in relation to FIG. 1 show that, in the motor described with reference to FIG. 3, the magnetic axis 72a of the magnet 72 could be disposed virtually anywhere in a plane defined by the axis of rotation 70c and the straight line 33, and the magnetic axis 73a of the magnet 73 could be disposed virtually anywhere in another plane defined by the axis of rotation 71c and the straight line 34. Once again, the only position in which the magnetic axes 72a and 73a cannot be located are those where they are coincident with the axes of rotation 70c and 71c respectively.

Likewise, the magnetic axes 72a and 73a may be oriented in any directions in which the field of the respective magnets 72 and 73 is such that its resultant in the portion of the corresponding plane which is in the cylindrical space 55 and 61 respectively has a non-zero component in the desired direction of the rest axis 70b and 71b respectively.

It will be appreciated that in this case too, the positioning magnet 72 must be so disposed as to apply to the magnet 70 a force which is greater than that it applies to the magnet 71, and that the magnet 73 must be so disposed as to apply to the magnet 71 a force which is greater than that it applies to the magnet 70.

In the construction described with reference to FIG. 3a in which the positioning magnets 72 and 73 are replaced by a single magnet 80, considerations similar to those set out above show that the positioning magnet 80 may also be so disposed that its magnetic axis 80a is in a plane containing the two axes of rotation 70c and 71c. The magnetic axis 80a must also be disposed virtually at an equal distance from the axes of rotation 70c and 71c and it may assume any of the orientations in which its field is such that the resultant thereof in the portions of that plane which are in the cylindrical spaces 55 and 61 has a non-zero component in the desired direction of the rest axes 70b and 71b.

As in the case of FIG. 1, the axial components of the forces applied by the positioning magnets 72 and 73 may be nullified by supplementary positioning magnets, the magnetic axes of which are symmetrical to the magnetic axes 72a and 73a with respect to the straight lines 33 and 34 respectively.

FIG. 3b is a cross-sectional view of a motor similar to the motor shown in FIG. 3, comprising the above-mentioned supplementary positioning magnets. All the other components of this motor are identical to the corresponding components of the motor shown in FIG. 3, and are denoted by the same references. The cross-sectional view in FIG. 3b passes through the two axes of rotation 70c and 71c, and the supplementary positioning magnets and their magnetic axes are denoted by references 72', 72a', and 73', 73a' respectively.

In the case of a motor such as that shown in FIG. 3a, a supplementary positioning magnet so disposed that its magnetic axis is symmetrical to the magnetic axis 80a with respect to the pole piece 52 also makes it possible to nullify the axial component of the force applied to the magnets 70 and 71 by the magnet 80. FIG. 3c is a cross-sectional view on a plane containing the two axes of rotation 70c and 71c of a motor comprising the above-mentioned supplementary magnet. The supplementary magnet and its magnetic axis are denoted by references 80' and 80a'. All the other components of this motor are identical to those of the motor shown in FIG. 3 and are denoted by the same references.

In the motor shown in FIG. 3, and in the alternative forms thereof, the magnetic field produced by the winding 67 in response to a current is distributed in the armature 65 on respective sides of the core 69 and in the pole pieces 53 and 59. The major part of the magnetic field returns to the core 69 by way of the pole piece 52 after having passed across the cylindrical spaces 55 and 61. A small proportion of that field returns to the core 69 by way of the pole pieces 54 and 60 and the armature 66. The lines of force of the magnetic field in the core 69, the armature 65, the pole pieces 53 and 59, and the pole piece 52 are diagrammatically indicated by the broken lines 74 and 75. The arrows 74a and 75a indicate the direction and the orientation of the resultant thereof in the cylindrical spaces 55 and 61, when a current which is arbitrarily defined as positive flows in the winding 67.

The winding 68 produces a similar magnetic field when a current flows therethrough. The lines of force of that field in the core 69, the armature 66, the pole pieces 54 and 60, and the pole piece 52 are diagrammatically indicated by the broken lines 76 and 77. The arrows 76a and 77a indicate the direction and orientation of the resultant thereof in the cylindrical spaces 55 and 61, when the current flowing in the winding 68 is positive.

By virtue of the relative arrangement of the various pole faces and the two positioning magnets, the field produced by the winding 67 is always at an obtuse angle to one of the rest axes 70b and 71b and an acute angle to the other rest axis. The same applies in regard to the field produced by the winding 68. The pratical and preferred values of such angles are the same as in the embodiment shown in FIG. 1.

It will be apparent that the above-mentioned considerations also apply to the alternative forms shown in FIGS. 3a, 3b and 3c.

Figure 4:
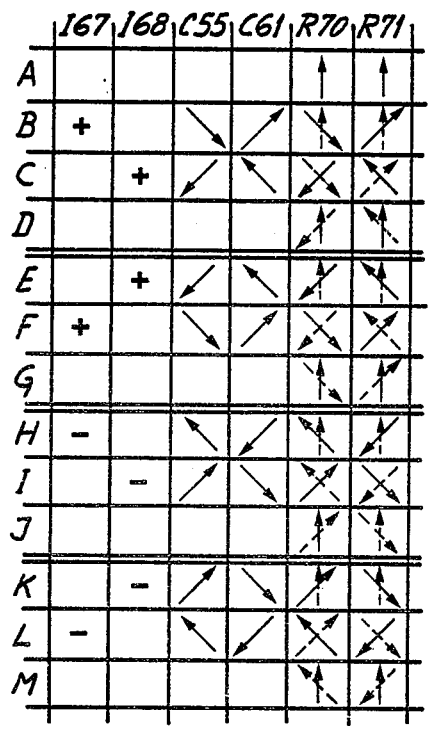
FIG. 4 is a table summarizing the various stages in actuation of the motor unit shown in FIG. 3.

FIG. 4 shows a table summarizing the mode of operation of the motor shown in FIG. 3. As in the FIG. 2 table, line A corresponds to the rest condition of the motor, lines B, C and D, and E, F and G summarize the mode of actuating the motor in order for the magnet 70 to perform a revolution in the direction of the arrow 78 and in the opposite direction respectively, while lines H, I and J, and K, L and M summarize the mode of actuating the motor in order for the magnet 71 to perform a revolution in the direction of the arrow 79 and in the opposite direction respectively.

The signs + and − in the columns headed I67 and I68 indicate that a positive current or a negative current respectively is caused to flow in the winding 67 or 68. The arrows illiustrated in columns C55 and C61 indicate the direction and the orientation of the resultant of the field generated by those currents in the cylindrical spaces 55 and 61. Finally, the solid-line arrows in the columns R70 and R71 indicate the positions assumed by the magnetic axes 70a and 71a of the magnets 70 and 71 in response to the above-mentioned fields or under the influence of the positioning torque produced by the magnets 72 and 73, while the broken-line arrows indicate the previous position of the magnetic axes 70a and 71a.

The various stages in actuation of the motor shown in FIG. 3, as summarized by the FIG. 4 table, are similar to the corresponding stages in actuation of the motor shown in FIG. 1 and they will not be described in detail here. In fact, it will be readily seen that, as in the case of the motor shown in FIG. 1, the magnet 70 rotates through one step in response to each pair of positive current pulses applied to the windings 67 and 68, and the magnet 71 rotates through one step in response to each pair of negative current pulses applied to that windings. The magnets 70 and 71 rotate in the positive direction when the first pulse of a pair is applied to the winding 67 and in the negative direction when the first pulse is applied to the winding 68.

It will also be readily seen that, if the positioning magnets 72 and 73 were so disposed that the rest axes 70b and 71b are both facing in the opposite direction to the direction in which they point in FIG. 3, it would be the magnet 71 which would rotate through a step in response to each pair of positive current pulses and the magnet 70 which would rotate through a step in response to each pair of negative current pulses. The direction of rotation of the magnets 70 and 71 would be the same as described hereinbefore.

To sum up, as in the case of FIG. 1, the two magnets of the motor shown in FIG. 3 are actuated individually and stepwise by pairs of current pulses in the same direction, the first of which is applied to one of the windings and the second is applied to the other winding. The direction of those current pulses determines which of the magnets performs a step, and the order in which the pulses are applied to the windings determines the direction of rotation of that magnet.

It will be appreciated that, in this case also, the second pulse of each pair may be triggered a moment before or after the end of the first pulse, with the same consequences as in actuation of the motor shown in FIG. 1.

Figure 5:
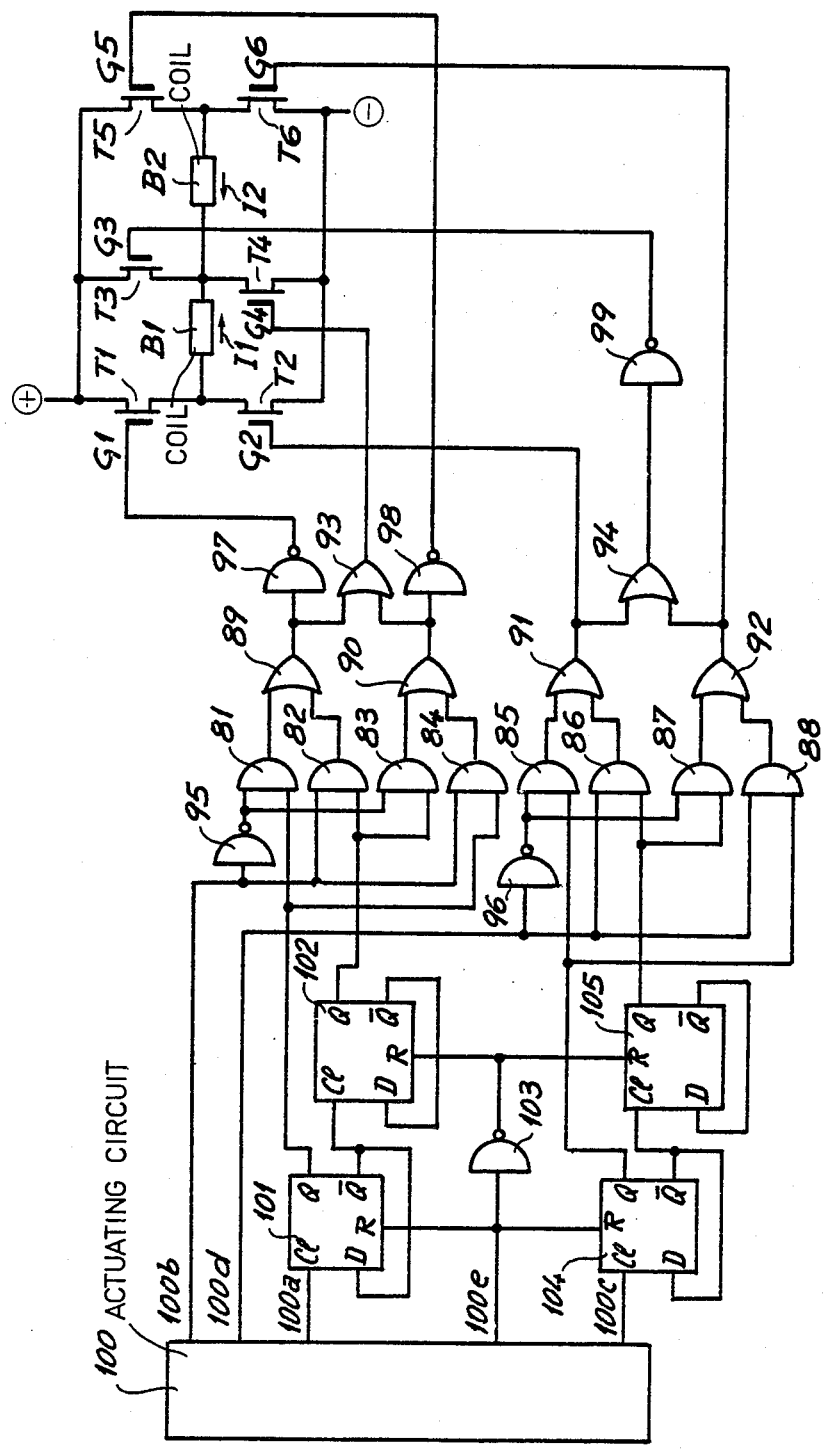
FIG. 5 is the circuit diagram of an embodiment of the control circuit for the motor unit according to the invention.

FIG. 5 shows the circuit diagram of an embodiment of a circuit for actuating a motor according to the invention, while FIGS. 6a, 6b, 7a and 7b are diagrams representing signals as measured at various points in the circuit in the four possible actuation situations.

The motor which may be any one of the motors described hereinbefore is represented in FIG. 5 by its two windings referenced B1 and B2. The windings B1 and B2 are connected in a double bridge arrangement formed by six field effect transistors (FET's) T1 to T6. The transistors T1, T3 and T5 are P channel FET's and have their source connected to the positive pole of the power supply source (not shown) of the circuit. The transistors T2, T4 and T6 are N channel FET's and have their source connected to the negative pole of the power source.

The drains of the transistors T1 and T2 are together connected to one of the terminals of the winding B1, the drains of the transistors T5 and T6 are together connected to one of the terminals of the winding B2, and the drains of the transistors T3 and T4 are together connected to the second terminals of the windings B1 and B2.

The direction in which the wire forming the windings is wound is such that the direction of the current designated I1 and I2 respectively in FIG. 5 corresponds to the direction of the current defined as positive in the description relating to FIGS. 1 and 3.

The gates G1 to G6 of the transistors T1 to T6 are connected to a logic circuit formed by AND-gates 81 to 88, OR-gates 89 to 94 and inverters 95 to 99 which are connected together in the manner illustrated.

The gates G1 to G6 receive from that logic circuit signals which are at logic state 0 or logic state 1. Those logic states are respectively represented by the potential of the negative terminal of the power source and the potential of the positive terminal of the power source. A signal 0 applied to one of the gates G2, G4 and G6 or a signal 1 applied to one of the gates G1, G3 and G5 therefore causes the corresponding transistor to be switched into the non-conducting condition. On the other hand, a signal 1 applied to one of the gates G2, G4 and G6 or a signal 0 applied to one of the gates G1, G3 and G5 switches the corresponding transistor into a conducting condition.

An actuating circuit 100 which will not be described in detail combines all the other electronic circuits of the device with which the motor is associated. If that device is an electronic timepiece, the circuit 100 comprises a time base generally formed by a quartz oscillator and a frequency divider, a time setting circuit associated with a control stem and/or one or more push buttons and, if appropriate, auxiliary circuits such as a chronograph, alarm or other circuit.

The circuit 100 in the illustrated embodiment comprises an output 100a which produces a pulse, that is to say, which temporarily assumes logic value 1, whenever one of the magnets of the motor is to perform a step. In the illustrated embodiment, that magnet is the magnet 19 of the motor shown in FIG. 1 or the magnet 70 of the motor shown in FIG. 3.

Still by way of example, the direction of rotation of that magnet is determined by a signal produced by the circuit 100 at an output 100b, which is connected to the input of inverter 95 and to one input of the gates 82 and 84. That signal is at logic state 0 when the magnet is to rotate in its positive direction and at logic state 1 when the magnet is to rotate in its negative direction.

Likewise, the circuit 100 produces at an output 100c a pulse which assumes logic value 1 whenever the second magnet of the motor is to perform a step. In the embodiment described, that magnet is the magnet 20 of the motor shown in FIG. 1 or the magnet 71 of the motor shown in FIG. 3. The direction of rotation of the second magnet is determined by a signal produced by an output 100d of the circuit 100, which output 100d is connected to the input of the inverter 96 and to one input of the gates 86 and 88. Once again, the signal is at logic state 0 if the second magnet is to rotate in its positive direction and at logic state 1 if the second magnet is to rotate in its negative direction.

The circuit 100 also produces at an output 100e a periodic signal at a frequency of 128 Hz for example, with which the signals produced by the outputs 100a and 100c are synchronized in such a way that they go to logic state 1 at a time at which the signal produced by the output 100e goes to logic state 0.

Finally, the circuit 100 is so arranged that the outputs 100a and 100c never supply their signal simultaneously.

The clock input C1 of a D-flip-flop 101 is connected to the output 100a of the circuit 100. The Q output of the flip-flop 101 is connected to one input of the gates 81 and 84, its $\overline{Q}$ output is connected to its D input and its reset input R is connected to the output 100e of the circuit 100.

A second flip-flop, also of type D, denoted by reference 102, has its clock input C1 connected to the $\overline{Q}$ output of the flip-flop 101, its Q output connected to one input of the gates 82 and 83, its $\overline{Q}$ output connected to its D input and its reset input R connected to the output 100e of the circuit 100 by way of an inverter 103.

A third D-flip-flop 104 has its clock input C1 connected to the output 100c of the circuit 100, its Q output connected to one input of the gates 85 and 88, its $\overline{Q}$ output connected to its D input, and its reset input R connected to the output 100e of the circuit 100.

Finally, a fourth D-flip-flop 105 has its clock input C1 connected to the $\overline{Q}$ output of the flip-flop 104, its Q output connected to one input of the gates 86 and 87, its $\overline{Q}$ output connected to its D input and its reset input R connected to the output of the inverter 103.

It will be readily seen that, when the Q outputs of the flip-flops 101, 102, 104 and 105 are at logic state 0, the gates G1, G3 and G5 of the transistors T1, T3 and T5 are at logic state 1 and the gates G2, G4 and G6 of the transistors T2, T4 and T6 are logic state 0. All the transistors T1 to T6 are therefore non-conducting and no current flows in the windings B1 and B2.

Whenever the output 100a of the circuit 100 produces a pulse, the Q output of the flip-flop 101 goes to logic state 1. The Q output of the flip-flop 101 goes back to state 0 when the signal produced by the output 100e of the circuit 100 goes to state 1. The Q output of the flip-flop 101 therefore supplies a pulse which is at state 1 during a half-period of the signal produced by the output 100e of the circuit 100, that is to say, for about 3.9 milliseconds.

At the end of each pulse produced by the Q output of the flip-flop 101, the Q output of the flip-flop 102 also goes to state 1 and goes back to state 0 about 3.9 milliseconds later when the output 100e of the circuit 100 goes to state 0.

The Q outputs of the flip-flops 101 and 102 therefore produce two successive pulses each of a duration of about 3.9 milliseconds whenever the first magnet of the motor is to rotate through a revolution.

When the output 100b of the circuit 100 is at state 0, the first of those two pulses is transmitted by the gates 81 and 89 and is applied to the gate G1 of the transistor T1 by way of the inverter 97 and to the gate G4 of the transistor T4 by way of the gate 93. Those two transistors T1 and T4 are therefore switched into the conducting condition for the duration of that pulse, and a current flows in the winding B1 in the positive direction.

The second of those pulses, which is supplied by the Q output of the flip-flop 102, is transmitted by way of the gates 83 and 90 and applied to the gate G4 of the transistor T4 by way of the gate 93 and to the gate G5 of the transistor T5 by way of the inverter 98. The transistor T1 therefore switches back into the non-conducting condition, the transistor T4 remains in the conducting condition, and the transistor T5 switches into the conducting condition for the duration of the second pulse. The current in the winding B1 is therefore cut off and a current flows in the winding B2 in the positive direction.

Positive current pulses therefore flow through the windings B1 and B2 in succession and in that order, in response to the signal supplied by the output 100a of the circuit 100. That situation, which is illustrated by the diagrams shown in FIG. 6a, corresponds to the situation shown by lines B, C and D of the tables illustrated in FIGS. 2 and 4. The first magnet of the motor, and therefore the rotor of which it is part, performs a step, that is to say a complete revolution, in the positive direction in response to each pulse supplied by the output 100a of the circuit 100 when the output 100b of the circuit 100 is at state 0.

When the output 100b of the circuit 100 is at state 1, the pulse supplied by the Q output of the flip-flop 101 is transmitted by way of the gates 84 and 90 and is applied to the gate G4 of the transistor T4 by way of the gate 93 and to the gate G5 of the transistor T5 by way of the inverter 98. Those two transistors T4 and T5 therefore conduct and a current flows in the winding B2 in the positive direction for the duration of that pulse.

The pulse which is then supplied by the Q output of the flip-flop 102 is transmitted by way of the gates 82 and 89 and is applied to the gate G1 of the transistor T1 by way of the inverter 97 and to the gate G4 of the transistor T4 by way of the gate 93. The transistor T5 therefore switches back into the non-conducting condition, the transistor T4 remains in a conducting condition and the transistor T1 is switched into a conducting condition. A current which is also positive therefore flows in the winding B1 for the duration of that pulse.

Figures 6A, 6B, 7A, 7B:
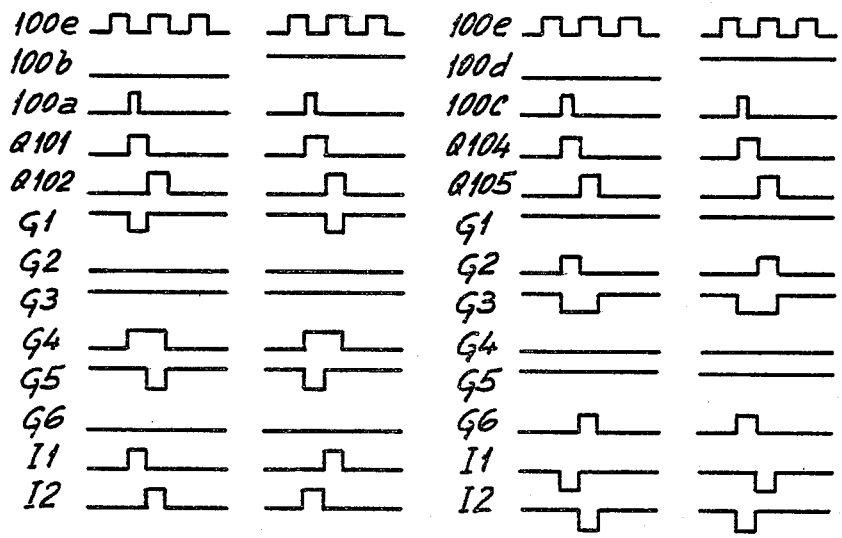
FIGS. 6a, 6b, 7a and 7b are diagrams representing signals as measured at various points in the circuit shown in FIG. 5 during the various stages in actuation of the motor unit according to the invention.

This time, positive current pulses have therefore flowed through the windings B2 and B1 in succession and in that order, in response to the signal supplied by the output 100a of the circuit 100. That situation which is illustrated in FIG. 6b corresponds to the condition illustrated by lines E, F and G of the tables shown in FIGS. 2 and 4. The first magnet of the motor therefore performs a step in the negative direction in response to each pulse supplied by the output 100a of the circuit 100 when the output 100b of the circuit 100 is at state 1.

It will be readily seen, by analogy with the description of the mode of operation of the flip-flops 101 and 102, that the Q outputs of the flip-flops 104 and 105 produce two successive pulses each time that the output 100c of the circuit produces a pulse.

When the output 100d of the circuit 100 is at state 0, the pulse supplied by the Q output of the flip-flop 104 is applied to the gate G2 of the transistor T2 by way of the gates 85 and 91 and to the gate G3 of the transistor T3 by way of the gate 94 and the inverter 99. The transistors T2 and T3 therefore conduct and a negative current flows in the winding B1 for the duration of that pulse.

The pulse which is then supplied by the Q output of the flip-flop 105 is applied to the gate G6 of the transistor T6 by way of the gates 87 and 92 and to the gate G3 of the transistor T3 by way of the gate 94 and the inverter 99. The transistor T3 therefore remains in a conducting condition and the transistor T6 switches into a conducting condition for the duration of that pulse, and a negative current flows in the winding B2. That case, which is illustrated in FIG. 7a, corresponds to the situation of lines H, I and J in the tables shown in FIGS. 2 and 4.

The second magnet of the motor therefore performs a step in the positive direction in response to each pulse supplied by the output 100c of the circuit 100 when the output 100d of the circuit 100 is at state 0.

When the output 100d of the circuit 100 is at state 1, the pulse supplied by the Q output of the flip-flop 104 is applied to the gate G6 of the transistor T6 by way of the gates 88 and 92 and to the gate G3 of the transistor T3 by way of the gate 94 and the inverter 99. Those two transistors T3 and T6 therefore conduct and a negative current flows in the winding B2 during that pulse.

The pulse which is then supplied by the Q output of the flip-flop 105 is applied to the gate G2 of the transistor T2 by way of the gates 86 and 91 and to the gate G3 of the transistor T3 by way of the gate 94 and the inverter 99. The transistor T3 therefore remains in a conducting condition and the transistor T2 switches into a conducting condition for the duration of that pulse, and a negative current flows in the winding B1.

That case, as illustrated in FIG. 7b, corresponds to the case illustrated by lines K, L and M of the tables shown in FIGS. 2 and 4. The second magnet of the motor therefore performs a stepping motion in the negative direction in response to each pulse supplied by the output 100c of the circuit 100, when the output 100d of that circuit is at state 1.

The above-described control circuit produces pairs of current pulses of equal durations. In addition, the beginning of the second pulse of each pair coincides with the end of the first pulse. Finally, all the transistors T1 to T6 are non-conducting between the pairs of current pulses. It will be apparent that it is possible to modify that control circuit, if necessary, so that it produces pulses of different durations, and/or so that the second pulse of each pair is triggered before or after the end of the first pulse. It is also possible to modify it so that the three transistors T1, T3 and T5, or the three transistors T2, T4 and T6, are in a conducting condition between the current pulses, in order to short-circuit the windings and accelerate damping of the oscillations performed by the magnets about their rest position at the end of their stepping motion. Those modifications are within the capability of the man skilled in the art and will not be described herein.

The motor control circuit may also be combined with a circuit for controlling the duration of the current pulses in dependence on the magnitude of the mechanical load which is actually being driven by the motor. In the cases where the two windings are never triggered simultaneously, it is possible for the pulses duration control circuit to be connected to the winding which does not have a current flowing therein, by means of a switching circuit actuated by the signals supplied by the logic circuit. The pulse duration control circuit can then simply use the voltage induced in the winding to which it is connected, to cause the current in the other winding to be cut off at a moment depending on the mechanical load driven by the motor. There are many types of such control circuits which are well known and which will not be described herein.

It will be appreciated that the present invention is not limited just to the embodiments described and illustrated by the drawings. Many modifications may be made, in particular in the form and the arrangement of the different parts of the motor, without thereby departing from the scope of the invention.

I claim:

1. A motor unit comprising:
    a first rotor having a first axis of rotation and including a first permanent magnet having a first magnetic axis substantially perpendicular to the first axis of rotation;
    a second rotor having a second axis of rotation and including a second permanent magnet having a second magnetic axis substantially perpendicular to the second axis of rotation;
    means for orienting the first and second magnetic axes along a first rest axis and a second rest axis respectively, in the absence of any other influence; and
    means for applying to the first magnet and to the second magnet a first magnetic field in response to a first current and a second magnetic field in response to a second current, the first and second magnetic fields being substantially perpendicular to the first axis of rotation and to the second axis of rotation and also forming two substantially symmetrical obtuse angles with one of the rest axes and two substantially symmetrical acute angles with the other rest axis.

2. The motor unit of claim 1 wherein the means for applying a first and a second magnetic field comprise:
    a first pole piece comprising a first pole face substantially symmetrical with respect to the first rest axis and a second pole face substantially symmetrical with respect to the second rest axis;
    a second pole piece and a third pole piece respectively comprising a third pole face and a fourth pole face substantially symmetrical to each other with respect to the first rest axis and defining with the first pole face a first substantially cylindrical space having an axis substantially coincident with the first axis of rotation;
    a fourth pole piece and a fifth pole piece respectively comprising a fifth pole face and a sixth pole face substantially symmetrical to each other with respect to the second rest axis and defining with the second pole face a second substantially cylindrical space having an axis substantially coincident with the second axis of rotation;

a first winding comprising a core having first and second ends respectively connected to the second pole piece and the fourth pole piece; and a second winding comprising a core having first and second ends respectively connected to the third pole piece and to the fifth pole piece;

and wherein the first magnetic axis is oriented in a direction from the middle of the first pole face towards the first axis of rotation and the second magnetic axis is oriented in a direction from the middle of the second pole face towards the second axis of rotation, or both magnetic axes are oriented in the opposite directions.

3. The motor unit of claim 2 wherein the means for orienting the first and second magnetic axes comprise a third permanent magnet coupled to the first permanent magnet and having a third magnetic axis disposed substantially in a plane comprising the first axis of rotation and passing through the middle of the first pole face and a fourth permanent magnet coupled to the second permanent magnet and having a fourth magnetic axis disposed substantially in a plane comprising the second axis of rotation and passing through the middle of the second pole face.

4. The motor unit of claim 3 wherein the means for orienting the first and second magnetic axes further comprise a fifth permanent magnet having a fifth magnetic axis substantially symmetrical to the third magnetic axis with respect to a straight line perpendicular to the first axis of rotation and passing through the middle of the first pole face and a sixth permanent magnet having a sixth magnetic axis substantially symmetrical to the fourth magnetic axis with respect to a straight line perpendicular to the second axis of rotation and passing through the middle of the second pole face.

5. The motor unit of claim 1 wherein the means for applying a first and second magnetic field comprise:
a first pole piece comprising a first pole face which is substantially symmetrical with respect to the first rest axis and a second pole face which is substantially symmetrical with respect to the second rest axis;
a second pole piece and a third pole piece respectively comprising a third pole face and a fourth pole face which are substantially symmetrical to each other with respect to the first rest axis and which define with the first pole face a first substantially cylindrical space having an axis which is substantially coincident with the first axis of rotation;
a fourth pole piece and a fifth pole piece respectively comprising a fifth pole face and a sixth pole face which are substantially symmetrical to each other with respect to the second rest axis and which define with the second pole face a second substantially cylindrical space having an axis substantially coincident with the second axis of rotation;
a first armature connected to the second and the fourth pole pieces and a second armature connected to the third and fifth pole pieces;
a first winding and a second winding; and
means for magnetically connecting the first winding and the second winding to the first pole piece and to the first and second armatures respectively;
and wherein the first magnetic axis is oriented in a first direction substantially from the middle of the first pole face towards the first axis of rotation and the second magnet axis is oriented in a second direction substantially from the second axis of rotation towards the middle of the second pole face.

6. The motor unit of claim 5 wherein the means for magnetically connecting the first and second windings to the first pole piece and to the first and second armatures respectively comprise a core magnetically coupled to the two windings and having a central portion disposed between the two windings and connected to the first pole piece, and two ends respectively connected to the first and second armatures.

7. The motor unit of claim 5 wherein the means for magnetically connecting the first and second windings to the first pole piece and to the first and second armatures respectively comprise a first core and a second core respectively magnetically coupled to the first winding and to the second winding and each having a first end connected to the first pole piece and a second end connected to the first armature and the second armature respectively.

8. The motor unit of claim 5 wherein the means for orienting the first and the second magnetic axes comprise a third permanent magnet coupled to the first and to the second permanent magnet and having a third magnetic axis disposed to orient the first magnetic axis in the first direction and the second magnet axis in the second direction.

9. The motor unit of claim 8 wherein the means for orienting the first and the second magnetic axes further comprise a fourth permanent magnet having a fourth magnetic axis disposed substantially symmetrically to the third magnetic axis with respect to the first pole piece.

10. The motor unit of claim 5 wherein the means for orienting the first and the second magnetic axes comprise a third permanent magnet coupled to the first permanent magnet and having a third magnetic axis disposed substantially in a plane comprising the first axis of rotation and passing through the middle of the first pole face, and a fourth permanent magnet coupled to the second permanent magnet and having a fourth magnetic axis disposed substantially in a plane comprising the second axis of rotation and passing through the middle of the second pole face.

11. The motor unit of claim 10 wherein the means for orienting the first and second magnetic axes further comprise a fifth permanent magnet having a fifth magnetic axis substantially symmetrical to the third magnetic axis with respect to a straight line perpendicular to the first axis of rotation and passing through the middle of the first pole face and a sixth permanent magnet having a sixth magnetic axis substantially symmetrical to the fourth magnetic axis with respect to a straight line perpendicular to the second axis of rotation and passing through the middle of the second pole face.

12. The motor unit of claim 1 wherein the value of the obtuse angles is from about 100° to about 160° and the value of the acute angles is from about 20° to about 80°.

13. The motor unit of claim 12 wherein the value of the obtuse angles is equal to about 120° and the value of the acute angles is equal to about 60°.

14. A method for actuating the motor unit of claim 2 comprising:
producing a first pair of successive current pulses of a first direction;
applying the first and the second pulse of the first pair to the first and to the second winding respectively to rotate the first rotor in a first direction;

applying the first and the second pulse of the first pair to the second and to the first winding respectively to rotate the first rotor in the second direction;

producing a second pair of successive current pulses of the second direction;

applying the first and the second pulse of the second pair to the first and to the second winding respectively to rotate the second rotor in a first direction; and applying the first and the second pulse of the second pair to the second and to the first winding respectively to rotate the second rotor in the second direction.

15. A method for actuating the motor unit of claim 5 comprising:

producing a first pair of successive current pulses of a first direction;

applying the first and the second pulse of the first pair to the first and to the second winding respectively to rotate the first rotor in a first direction;

applying the first and the second pulse of the first pair to the second and to the first winding respectively to rotate the first rotor in the second direction;

producing a second pair of successive current pulses of the second direction;

applying the first and the second pulse of the second pair to the first and to the second winding respectively to rotate the second rotor in a first direction; and applying the first and the second pulse of the second pair to the second and to the first winding respectively to rotate the second rotor in the second direction.

* * * * *